United States Patent
Zhang

(10) Patent No.: US 8,351,232 B2
(45) Date of Patent: Jan. 8, 2013

(54) POWER FACTOR CORRECTOR WITH HIGH POWER FACTOR AT LOW LOAD OR HIGH MAINS VOLTAGE CONDITIONS

(75) Inventor: Cheng Zhang, Nijmegen (CH)

(73) Assignee: NXP B.V., Eindhoven (NL)

( * ) Notice: Subject to any disclaimer, the term of this patent is extended or adjusted under 35 U.S.C. 154(b) by 568 days.

(21) Appl. No.: 12/647,958

(22) Filed: Dec. 28, 2009

(65) Prior Publication Data

US 2011/0157940 A1    Jun. 30, 2011

(51) Int. Cl.
*H02M 7/217* (2006.01)
(52) U.S. Cl. .......... 363/89; 323/283; 323/285; 323/288; 323/299
(58) Field of Classification Search .......... 323/222, 323/282, 283, 285, 288, 299; 363/84, 89
See application file for complete search history.

(56) References Cited

U.S. PATENT DOCUMENTS

| | | | | |
|---|---|---|---|---|
| 5,572,416 | A * | 11/1996 | Jacobs et al. | 363/89 |
| 6,137,700 | A * | 10/2000 | Iida et al. | 363/89 |
| 7,042,743 | B2 * | 5/2006 | Pidutti et al. | 363/89 |
| 7,292,013 | B1 * | 11/2007 | Chen et al. | 323/222 |
| 7,295,452 | B1 | 11/2007 | Liu | |
| 7,397,678 | B2 * | 7/2008 | Frank et al. | 363/89 |
| 7,511,460 | B1 * | 3/2009 | Chen et al. | 323/222 |
| 7,580,272 | B2 * | 8/2009 | Taguchi et al. | 363/89 |
| 7,733,678 | B1 * | 6/2010 | Notohamiprodjo et al. | 363/89 |
| 8,111,050 | B2 * | 2/2012 | Sutardja et al. | 323/207 |
| 8,174,855 | B2 * | 5/2012 | Ribarich et al. | 363/89 |
| 2004/0047166 | A1 * | 3/2004 | Lopez-Santillana et al. | 363/89 |
| 2005/0207193 | A1 * | 9/2005 | Adragna | 363/89 |
| 2008/0246444 | A1 | 10/2008 | Shao et al. | |
| 2009/0141524 | A1 * | 6/2009 | Fagnani et al. | 363/89 |
| 2011/0267856 | A1 | 11/2011 | Pansier | |

OTHER PUBLICATIONS

Lai, Ji-Sheng et al. "Design Consideration for Power Factor Correction Boost Converter Operating at the Boundary of Continuous Conduction Mode and Discontinuous Conduction Mode" 1993IEEE (0/7803-0982-0/93).
Kim, J.W. et al. Variable On-time Control of the Critical Conduction Mode Boost Power Factor Correction Converter to Improve Zero-crossing Distortion. IEEE Peds 2005. (0/7803-9296-5/05).
TEA1750 Green Chip III SMPS Control IC Product Data Sheet. Rev. 01—Apr. 6, 2007. NXP Semiconductors pp. 29.
TEA1742T Green Chip PFC Controller Product Data Sheet. Rev. 01—Jan. 12, 2009. NXP Semiconductors pp. 19.

* cited by examiner

*Primary Examiner* — Jeffrey Sterrett

(57) ABSTRACT

Various exemplary embodiments relate to a power factor corrector for low loads and a related method. The power factor corrector raises power factor at low loads or high mains voltages by having the a greater amount of current delivered to the load during the falling time of the absolute value of the mains AC voltage than during the applicable rising time. Various embodiments achieve this by increasing the switch-on time of a control switch during the falling time so that the majority of the switch-on time during a mains period occurs during the falling time. This may involve using a timing voltage increasing over a period within each half mains cycle to increase the switch-on time of conversion cycles in the falling time. This may also involve shifting the power conversion in time domain during each half mains cycle so that a majority of the time occurs during the falling time. Various embodiments may employ both methods.

27 Claims, 15 Drawing Sheets

POWER FACTOR CORRECTOR WITH HIGH POWER FACTOR AT LOW LOAD OR HIGH MAINS VOLTAGE CONDITIONS

TECHNICAL FIELD

Embodiments disclosed herein relate generally to a power electronic circuit and power factor correction.

BACKGROUND

Engineers have historically converted general electric alternating-current (AC) power (mains power) into direct-current (DC) power for use by a multitude of consumer devices. A power management system converts AC power from the main source into DC power using components with low losses in power dissipation, such as, for example, inductors, diodes, capacitors, transformers and other switches (JFETs, MOSFETs, etc.). Engineers may decrease the losses in the main source by focusing on the harmonics of the current drawn from the main source and the phase relationship between the mains voltage and the current drawn from the main source; the efficiency of the mains power supplying is measured by the power factor. The power factor of an AC to DC electric power system may be defined as a ratio of the real power drawn from the main source compared to the product of the root means square (rms) voltage $V_{rms}$ and current $I_{rms}$.

A power factor corrector (PFC), which may mainly consist of a bridge rectifier, a switch-mode power supply (SMPS), and control circuits, is widely used to help maximize power factor in power management systems and has been used for power management in personal computers, adapters and lighting. Power factor, therefore, is a key parameter in evaluating a PFC's overall performance. Power factor of PFCs operating at low load conditions has become more important recently, as PFCs may now work at low load conditions for most of the operation time. Also, power factor of PFCs operating with multiple mains voltage levels is always important, as mains voltage may have large variation between countries. Other power factor correctors in the prior art controlled the switch-on time of a control switch used in the SMPS, with the switch-on time maintaining a constant period after the PFC stabilized.

As an example, a typical SMPS design in a PFC may use a boost converter placed after a bridge rectifier and filter. Due to the filter current after the bridge rectifier, the current at the output of bridge rectifier may not equal the current drawn by the boost converter. At low load or high mains voltage conditions, because the current drawn by the boost converter is smaller, the filter current after the bridge rectifier may become more dominant. The source AC current may therefore become more concentrated within a shorter period. The higher concentration accordingly may increase the rms value of the source AC current, and therefore, may decrease the power factor, as the two quantities are inversely proportional.

In view of the foregoing, there has been long-felt need in the AC/DC power converter industry to deliver power more efficiently at low load or high mains voltage conditions.

SUMMARY

The present embodiments provide, among other features and benefits, significant advances in the control of power conversion, obtaining high power factor at low loads. A brief summary of various illustrative example embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to methods of controlling power delivered from the main source to a load by an power factor corrector having a bridge rectifier and a SMPS which may be a boost converter having a core inductor connected through a diode to a capacitor and an inductor current control switch that is switchable between an ON and an OFF state and conducts only during the ON state, for controlling a current through the core inductor, controlling a current delivered to the load. The power factor corrector receives a mains alternating-current (AC) voltage as an input, wherein the mains AC voltage has an absolute voltage value varying in a cyclic manner from a zero to a zero over a cycle period. The cycle period has a first half-cycle period during which the absolute voltage value increases from the zero to a maximum, and a second half-cycle period during which the absolute voltage value decreases from the maximum to the zero.

According to various embodiments, the current control switch generates a series of conversion cycles in a timed manner relative to the cycle period, each conversion cycle including a duration $T_{on}$ during which the current control switch is ON and a duration $T_{off}$ during which the current control switch is OFF. At steady-state of PFC, delivery of current is higher during the second half-cycle period, so that the average current of core inductor during the second half-cycle period is greater than the average current of core inductor during the first half-cycle period.

Among features and benefits provided by the various embodiments, this time domain shift of current delivery to the load provides substantially improved power factor for the PFC, especially at low load values or high mains AC voltage.

According to one aspect, the operation of current control switch shifts delivery of current to the second half-cycle period by increasing $T_{on}$ over the cycle period to have an average $T_{on}$ length during the second half-cycle period that is substantially longer than the average $T_{on}$ length during the first half-cycle period. The average current of the core inductor within the second half-cycle period is thereby controlled to be substantially larger than that within the first half-cycle period.

According to another aspect of one or more exemplary embodiments, the current control switch shifts delivery of current to the second half-cycle period by generating the series of conversion cycles only within a shifted time window, extending over the second half-cycle period substantially longer than extending over the first half-cycle period.

According to one aspect having, in one or more various exemplary embodiments, a current control switch generates conversion cycles only during a shifted time window, the value $T_{on}$ may be constant for the conversion cycles, wherein the shifted time window alone, by effecting a substantially larger number of the conversion cycles during the second half-cycle period than the first half-cycle period, provides an average current of the core inductor within the second half-cycle period substantially larger than that within the first half-cycle period.

According to another aspect having, in one or more various exemplary embodiments, a current control switch generates conversion cycles only during a shifted time window, the value $T_{on}$ may increase over the time window, to thereby provide an average current of the core inductor within the second half-cycle period substantially larger than that within the first half-cycle period by, in combination, effecting a substantially longer time for power conversion during the second half-cycle period than the first half-cycle period and, effecting a longer average $T_{on}$ for conversion cycles within the second half-cycle than for conversion cycles during the first half-cycle period.

BRIEF DESCRIPTION OF THE DRAWINGS

In order to facilitate better understanding of various exemplary embodiments, reference is made to the accompanying drawings, wherein.

DETAILED DESCRIPTION

Figure 1:
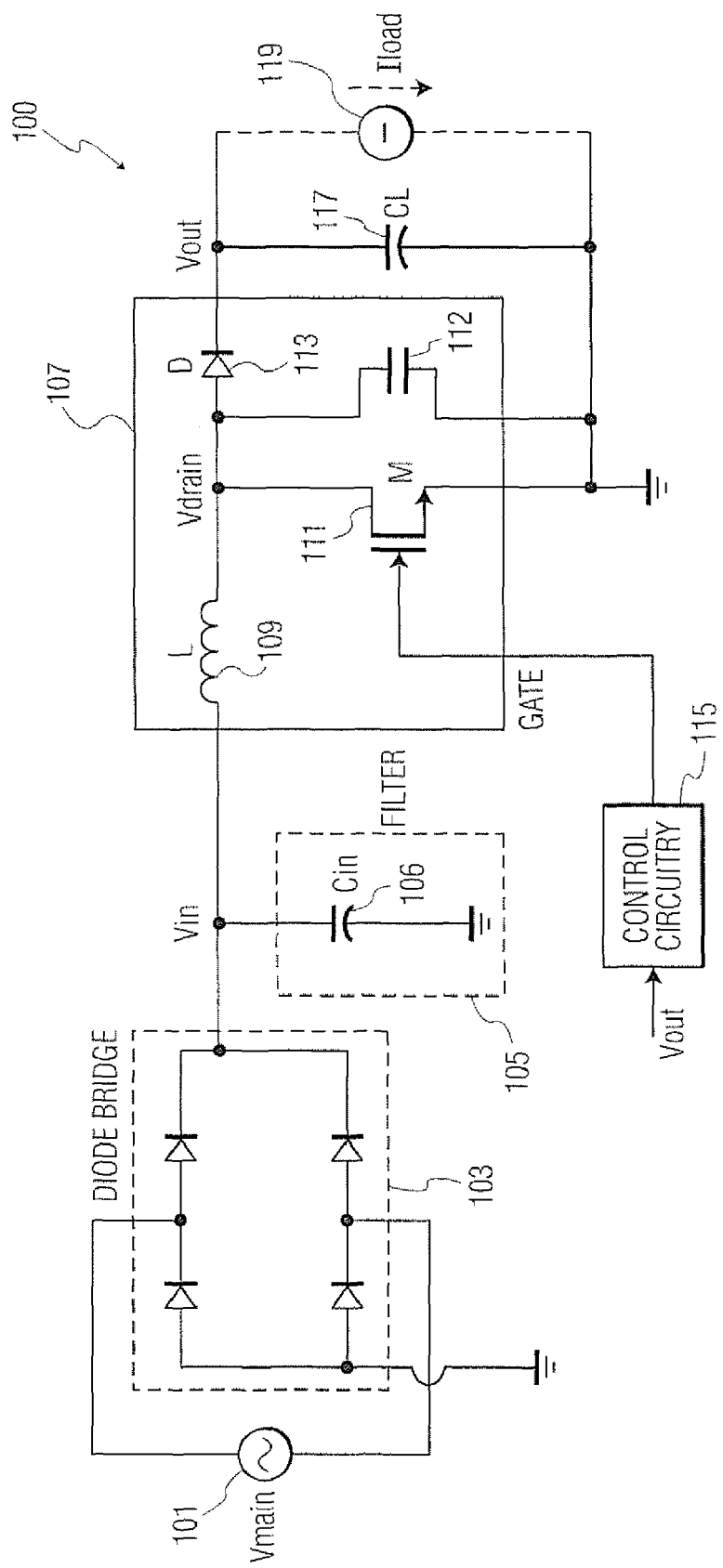
FIG. 1 is a schematic diagram of an exemplary power factor corrector.

Referring now to the drawings, in which like numerals refer to like components of steps, there are disclosed broad aspects of various exemplary embodiments.

FIG. 1 illustrates an exemplary AC/DC power converter 100 as one example implementation of one power factor corrector according to one example embodiment. Power converter 100 may connect to an AC power source 101, and may include a bridge rectifier 103, a filter 105, a capacitor 106, and a boost converter 107 comprising an inductor 109, control switch 111, ringing capacitor 112, and diode 113. The example power converter 100 also includes control circuitry for control switch 115, load capacitor 117, which attaches to load 119. During regular operation the bridge rectifier 103 may convert the mains AC voltage from power source 101 into a rectified voltage, the noise in this voltage may be reduced by filter 105 before this voltage is delivered to boost converter 107. As will be described in greater detail at later sections, the control circuitry 115 controls, in various particular described manners that relate to the periodic cycle of the mains AC voltage and the load 119, the opening and closing of control switch 111. As will also be described in greater detail, the current in inductor 109 increases when the switch is in its ON-state (i.e., the switch is closed) and power is only delivered to the load 119 when the switch is in its OFF-state (i.e., the switch is open).

AC power source 101 may be a general-purpose alternating current electric power supply. AC power source may deliver a mains AC voltage, which may vary by country and may be profiled by a specified voltage, frequency, plugs, and sockets. In the exemplary embodiment, AC power source 101 may deliver mains AC voltage characterized by a sine wave in the form of A sin (wt), where A is the amplitude of the mains AC voltage, w is the frequency of the wave, and t is time. Through bridge rectifier 103, mains AC voltage may be delivered during the entire cycle of one sine wave, which is referred to hereinafter as "the mains cycle."

Referring to FIG. 1, in the depicted example 100, bridge rectifier 103 may comprise two series of diodes (not separately numbered) connected in parallel, which may convert the mains AC voltage from AC power source 101 to an example rectified voltage, $V_{in}$. The output of the bridge rectifier 103 may be approximately characterized as |A sin (wt)|, as $V_{in}$ may be approximately characterized as the absolute value of the mains AC voltage. The configuration of the bridge rectifier 103 is not particular to the embodiments, and is not the only means for converting the mains AC voltage to a rectified voltage. A person of ordinary skill, in view of this disclosure, will recognize equivalent components to convert the mains AC voltage to a rectified voltage. With continuing reference to FIG. 1, filter 105 may be connected to the output of bridge rectifier 103 to reduce the noise. Filter 105 is characterized in the illustrative embodiment as a capacitor 106. A person of ordinary skill will recognize equivalent components to serve as a filter.

Continuing to refer to FIG. 1, the boost converter 107 in the depicted example 100 according to one embodiment may comprise inductor 109, control switch 111 controlled by control circuitry 115, ringing capacitor 112, and diode 113. Boost converter may also include load capacitor 117. In the illustrative embodiment, control switch 111 may be a JFET. A person of ordinary skill will recognize switches alternate to a JFET and, based on the present disclosure would understand how to reconfigure the power converter for their use. Boost converter 107 may receive the voltage produced by filter 105 $V_{in}$ and produce an output voltage $V_{out}$, which may be delivered to load 119. Boost converter 107 may be selected or configured to comply with standardized voltage conventions such as, for example, standard conventions for telecommunications devices, computer power supplies, or standard lighting sources. Boost converter 107 is merely an exemplary implementation; a person of skill in the art knows of other SMPS topologies to produce the same effect, such as, for example, a flyback converter.

Control circuitry 115 controls the functioning of boost converter 107 by controlling the conducting time of control switch 111 in each conversion cycle. The conversion cycle may include the switch-on time $T_{on}$, the time control switch is closed, and switch-off time $T_{off}$, the time the switch is open. During $T_{on}$, the current of inductor 109 is increasing, and the diode 113 is not conducting. During $T_{off}$, for the continuous conducting mode (CCM) operation, the current of inductor 109 is decreasing, and the diode 113 is conducting. For the boundary condition mode (BCM) operation, when the control switch is off, the current of inductor 109 will first decreasing, and the diode 113 is first conducting. Then, when the current of inductor 109 achieves zero, the diode 113 will stop conducting, and both the voltage Vdrain and the current of inductor 109 will start oscillation due to the combination of inductor 109 and ringing capacitor 112. It will be understood that ringing capacitor 112 may be a parasitic capacitance in control switch 111 such as, for example, if control switch 111 is a field-effect-transistor (FET) a gate-to-drain capacitance of such a FET, or may be a discrete capacitor incorporated into the boost converter.

For consistent terminology in describing examples, the term "one conversion cycle," in relation to the control switch 111, will be used to refer to the sum of one switch-on time $T_{on}$ and its succeeding switch-off time $T_{off}$. Assuming the voltage delivered to the load 119 remains the same, a conversion cycle with a larger $T_{on}$ time will deliver more power to the low load 119 than a conversion cycle with a smaller $T_{on}$ time, as the current of inductor 109 may be higher with larger $T_{on}$ time. A mains cycle preferably includes a large number of conversion cycles. For example, an exemplary mains cycle may be 20 ms, whereas an exemplary constant conversion cycle may be 10 μs, so that a single mains cycle may contain 2000 conversion cycles. During a single mains cycle, the conversion cycle of control switch 111 may increase, decrease, or remain constant.

Load 119 may be a standard electric device that may operate at low loads. This may include devices that operate in different modes, where one of the modes (e.g., a standby mode) has an operation point at low loads. Power converter 100 may be capable of operation both at low loads and at higher loads. Power converter 100 may also be capable of producing a high power factor at higher loads.

Figure 2:
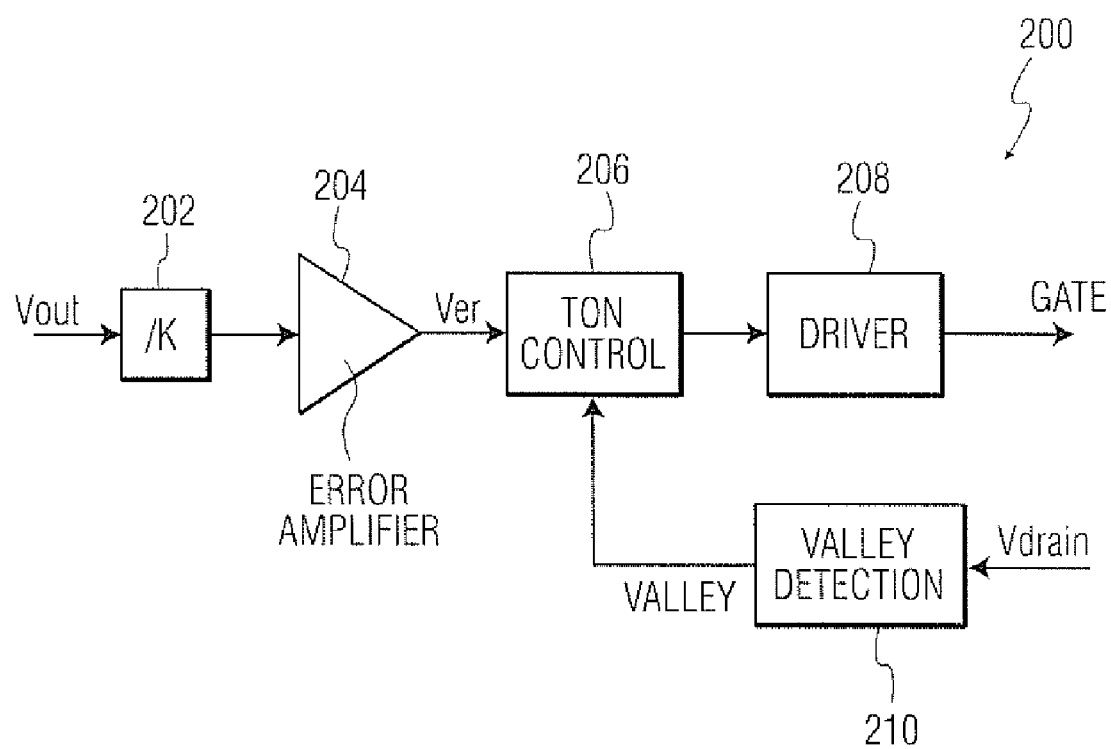
FIG. 2 is a block diagram of an exemplary control circuitry in a power factor corrector.

Referring now to FIG. 2, a block diagram of an exemplary control circuitry 115 is illustrated. Control circuitry 200 may include power divider 202, error amplifier 204, timer control circuit 206, driver 208, and valley-detection circuit 210. During regular operation, $V_{out}$ from boost converter 107 may first be divided at power divider 202 by a factor K, where K>1, to make $V_{out}$ easier to be processed by error amplifier, as will be understood by a person or ordinary skill in the art upon reading this disclosure. The resulting attenuated voltage signal $V_{out}/K$ may then be compared with a reference voltage $V_R$, and their difference is processed by error amplifier 204, whose output voltage, error voltage $V_{er}$ may be used to adjust switch-on time $T_{on}$.

Continuing to refer to FIG. 2, in boundary conduction mode operation, $V_{drain}$ may be sensed by valley-detection circuit 210 which may output an impulse to timer control circuit 206 when $V_{drain}$ achieves its minimum value (valley) during the oscillation time created by an LC circuit comprising inductor 109 and ringing capacitor 112. According to one example, valley detection circuit 206 detects when this minimum value (valley) is reached, produces an impulse and sends the impulse to the timer control circuit 206 that, in response, may trigger control switch 111 to turn on again.

As previously described, outputs of error amplifier 204 and valley-detection circuit 210 may be received by timer control circuit 206. Timer control circuit may, or may not have a current drive capacity sufficient to drive the control switch 111 and, if doe does not, the output of timer control circuit 206 may drive the driver 208 that, in turn, drives the control switch 111. In the illustrative embodiment, control circuitry 200 may receive $V_{out}$ from boost converter 106 and $V_{drain}$ corresponding to the drain voltage of control switch 111 to adjust the signal delivered to the gate of the same control switch 111. The shape of the signal to the switch may, for example, be a square wave.

Figure 3:
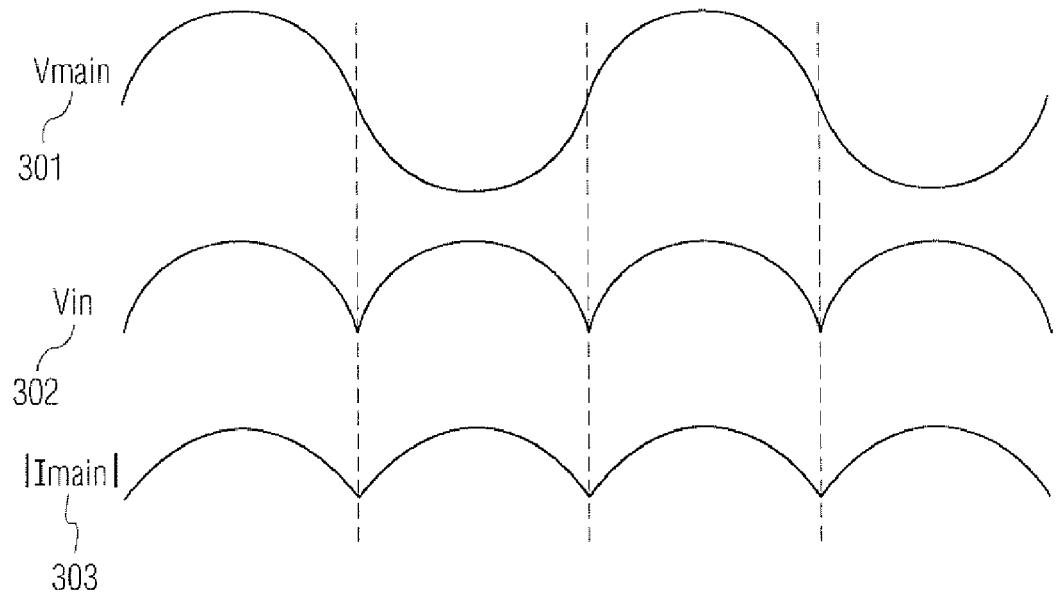
FIG. 3 is a timing diagram of the exemplary power factor corrector at steady state.

Referring now to FIG. 3, a timing diagram of the power factor corrector at steady state is illustrated. The timing diagrams of the mains AC voltage 301, voltage delivered by the filter $V_{in}$ 302, and the absolute value of mains AC current 303 are illustrate at steady state of power factor corrector 100, if the current through filter 105 after the bridge rectifier 103 is neglected. Due to a constant switch-on time $T_{on}$ in the conversion cycle of the control switch 111, the mains AC current may exhibit a similar shape to the mains voltage. The absolute value of mains AC current 303 may therefore illustrate an ideal power factor for power factor corrector 100.

Figure 4:
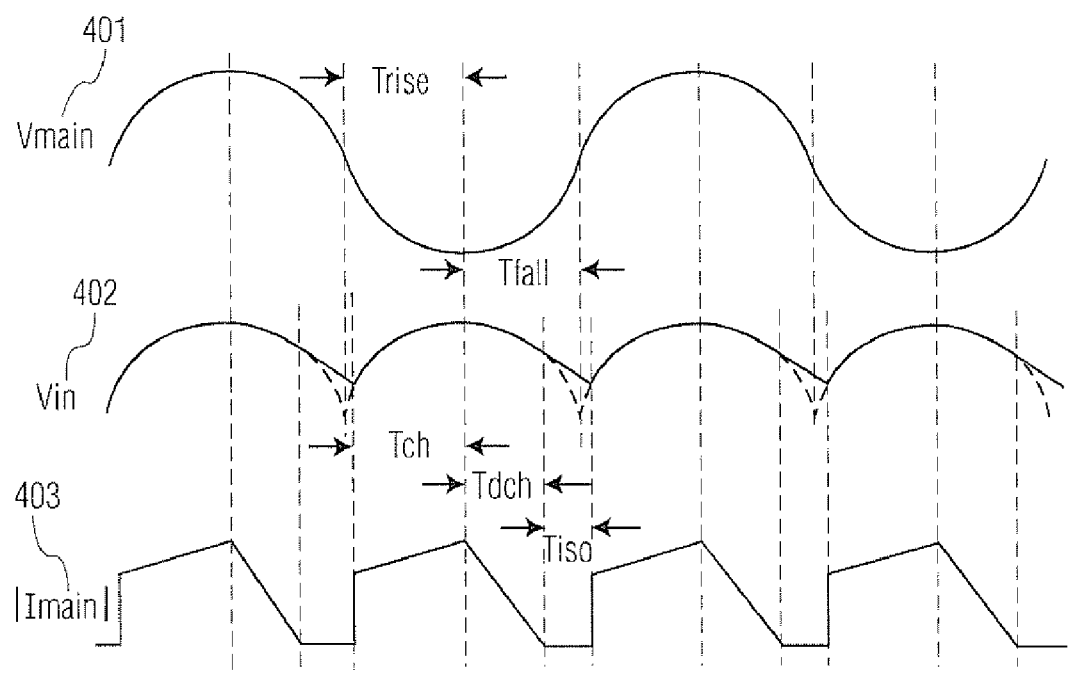
FIG. 4 is another timing diagram of the exemplary power factor corrector at steady state.

However, if the current of filter 105 after bridge rectifier 103 is considered, each cycle of $V_{in}$ corresponding to the mains cycle may be divided into three phases. Referring now to FIG. 4, another timing diagram of an exemplary power factor corrector is illustrated. Mains AC voltage 401 remains the same as mains AC voltage 301. The absolute value of mains AC voltage may be split into a rise time and a fall time. For filtered voltage $V_{in}$ 402, there may be three phases. During the first phase $T_{ch}$, the capacitor $C_{in}$ 106 may be charged by the mains power. The absolute value of mains AC current may therefore be the sum of the charge current of $C_{in}$ 106 and the current of inductor 109, and according to the equation:

$$|I_{main}| = I_{coil} + C_{in}\left|\frac{dV_{main}}{dt}\right|$$

Where $I_{main}$ is the mains AC current, $I_{coil}$ is the current of inductor 109, and $V_{main}$ is mains AC voltage 401. At the end of $T_{ch}$, filtered voltage $V_{in}$ 402 may achieve its maximum value, which may correspond to the maximum absolute value of mains AC voltage 401. During the second phase $T_{dch}$, capacitor $C_{in}$ 106 may discharge through the boost converter, where the absolute value of mains AC current may be equal to the difference between the current of inductor 109 and the discharge current of from capacitor $C_{in}$ 106, according to the equation:

$$|I_{main}| = I_{coil} - C_{in}\left|\frac{dV_{main}}{dt}\right|$$

At the end of the second phase $T_{dch}$, the current of inductor 109 may be equal to the discharge current from capacitor 106 that is equal to $C_{in}|dV_{main}|dt$. Thereafter, during the third phase $T_{iso}$, the current of inductor 109 may be smaller than the required discharge current $C_{in}|dV_{main}|dt$ to sustain the conducting of bridge rectifier, and therefore, filter 105 after bridge rectifier 103 may be isolated from AC power source 101 by bridge rectifier 103. As a result, there may be no current through the mains, and the discharge current of filter 105 may be equal to the current of inductor 109. Therefore, with a constant switch-on time $T_{on}$ for the conversion cycles of control switch 111, the voltage on filter 105 $V_{in}$ may decrease during phase $T_{iso}$ with, for example, an exponential function. In some embodiments, filter voltage 105 $V_{in}$ may decrease with an exponential function close to a linear function during phase $T_{iso}$.

Due to a control loop formed in power factor corrector 100, the coil current from inductor 109 may be proportional to the load current at steady state. As a result, with a high load current, the current of filter 105 may be neglected compared to the current of inductor 109. This means that the mains AC current may therefore exhibit approximately the same shape as the mains AC voltage. The current of filter 105 therefore may have negligible effect on the power factor at high load currents. However, with low load currents, the resulting low current of inductor 109 may make the current of filter 105 non-negligible. In this case, the mains AC current during phase $T_{ch}$ may be much larger than that during phases $T_{dch}$ and $T_{iso}$. During each cycle of $V_{in}$, a lower load current may lead to shorter $T_{dch}$ and $T_{ch}$ phases and a longer $T_{iso}$ phase. In such embodiments, the mains AC current may be concentrated in the $T_{rise}$ period of mains AC voltage 401. This may result in a higher $I_{rms}$ of mains AC current compared to when mains current is more evenly distributed throughout the half mains cycle.

If the amplitude of mains AC voltage is high, the current of inductor 109 may below, as power delivered from mains AC voltage source 101 may be equal to the power delivered to the load. The current of filter 105 may therefore be more dominant. This may result in the mains AC current becoming more concentrated. The current of filter 105 itself may be consequently be larger $C_{in}|dV_{main}|dt$ when the mains AC voltage is high. The higher filter current may also make the mains AC current more concentrated, which may result in a higher $I_{rms}$ of mains AC current compared to when mains current is more evenly distributed throughout the half mains cycle. This follows the equation for power factor in power factor corrector 100, which is:

$$PF = \frac{P_{real}}{V_{rms} I_{rms}}$$

Where $P_{real}$ is the real power drawn from the main source, $V_{rms}$ and $I_{rms}$ are the root mean squared (rms) voltage and root means squared current of the mains. Accordingly, the power factor may become lower with low load current or with high mains AC voltage due to the decreased ratio between the power drawn from the main source and the rms mains AC current.

According to an exemplary embodiment, the power factor may be increased at low load current or high mains AC voltage conditions by applying different currents of inductor 109 in different time intervals. A control circuitry 115 in power factor corrector 100 may make the average current of inductor 109 during the falling time of the absolute value of the mains AC voltage $I_{avg,f}$ larger than the average current of inductor 109 during the rising time of the absolute value of the mains AC voltage $I_{avg,r}$. In such an embodiment, the mains AC currents during time intervals $T_{rise}$ and $T_{fall}$ may be more symmetrical to each other. Due to larger current in the inductor $I_{avg,f}$ during $T_{fall}$, the time interval without any mains AC current, $T_{iso}$, may also be shorter and therefore, mains AC current may be more widely distributed in each half mains cycle, which may reduce $I_{rms}$ and may therefore increase the power factor of power factor corrector 100.

Figure 5:
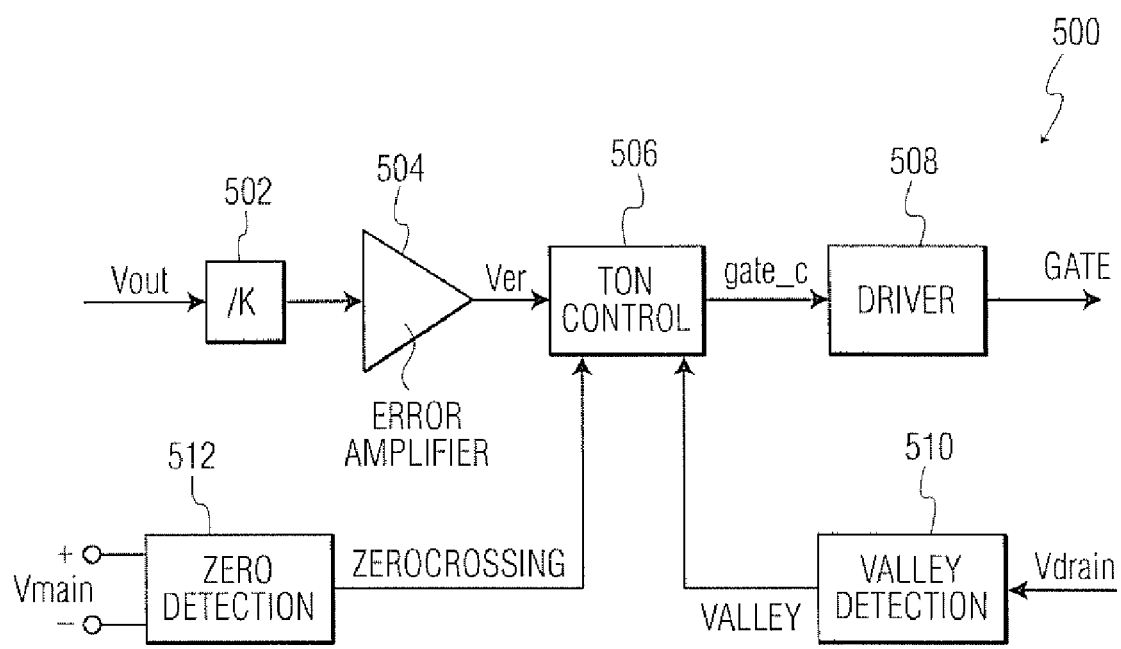
FIG. 5 is a block diagram of another exemplary control circuitry in a power factor corrector.

Referring now to FIG. 5, a block diagram of another exemplary control circuitry 500 according to one embodiment is illustrated. In this example 500 of the one embodiment, switch-on time $T_{on}$ of the control switch 111 conversion cycle increases from a zero-crossing point in the mains cycle, the moment that mains AC voltage 401 is zero, to the next zero-crossing point in the mains cycle. In some embodiments, switch-on time may increase from the moment near the zero-crossing point in the mains cycle to the moment near the next zero-crossing point in the mains cycle. Similar to the exemplary control circuitry 200 in FIG. 2, with devices 502-510 matching the functionality of devices 202-210, control circuitry 500 adds zero-detection block 512, which detects the zero-crossing points of the mains cycle and outputs a zero-crossing signal in the form of a square wave to timer control circuit 506.

Figure 6A:
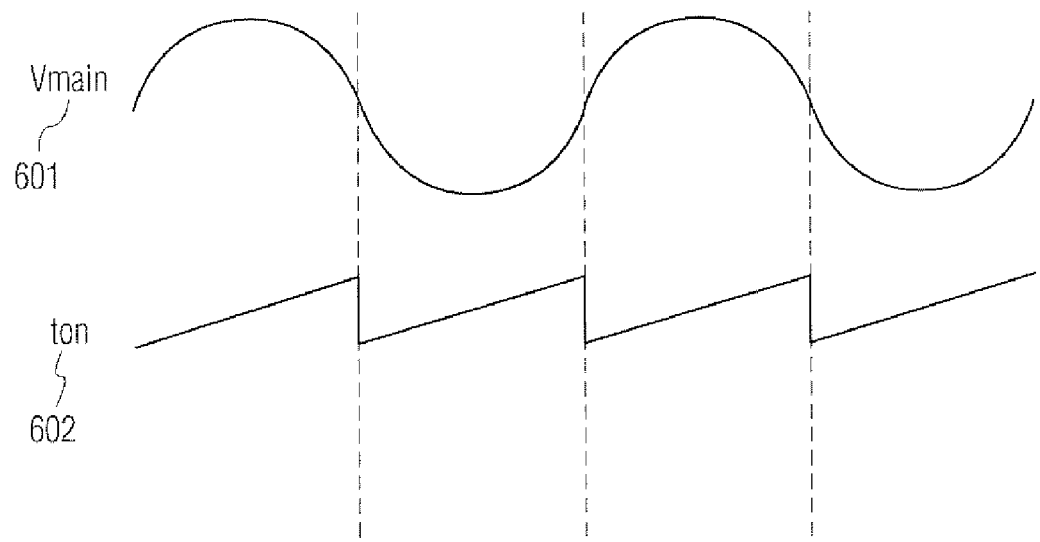
FIG. 6A is a timing diagram of the exemplary power factor corrector.
Figure 6B:
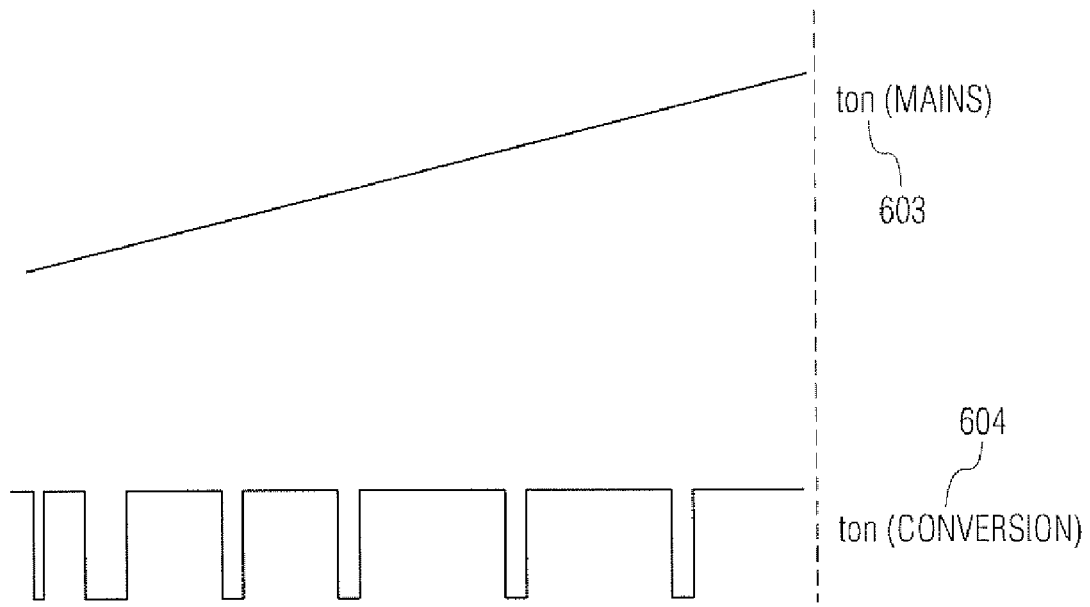
FIG. 6B is another timing diagram of the exemplary power factor corrector.

Referring now to FIG. 6A, a timing diagram of another exemplary power factor corrector is illustrated. With mains AC voltage 601 equivalent to mains AC voltage 301, 401, switch-on time $T_{on}$ 602 of the conversion cycle of control switch 111 may be increased linearly during a single mains half cycle period from one zero-crossing point in the mains cycle to the next zero-crossing point in the mains cycle. Referring now to FIG. 6B, a timing diagram of switch-on time $T_{on}$ during a single mains half cycle period is illustrated. When switch-on time $T_{on}$ 603, increases during the mains half cycle period, control switch 111 remaining on for longer within a single conversion cycle than within the last conversion cycle.

Figure 7:
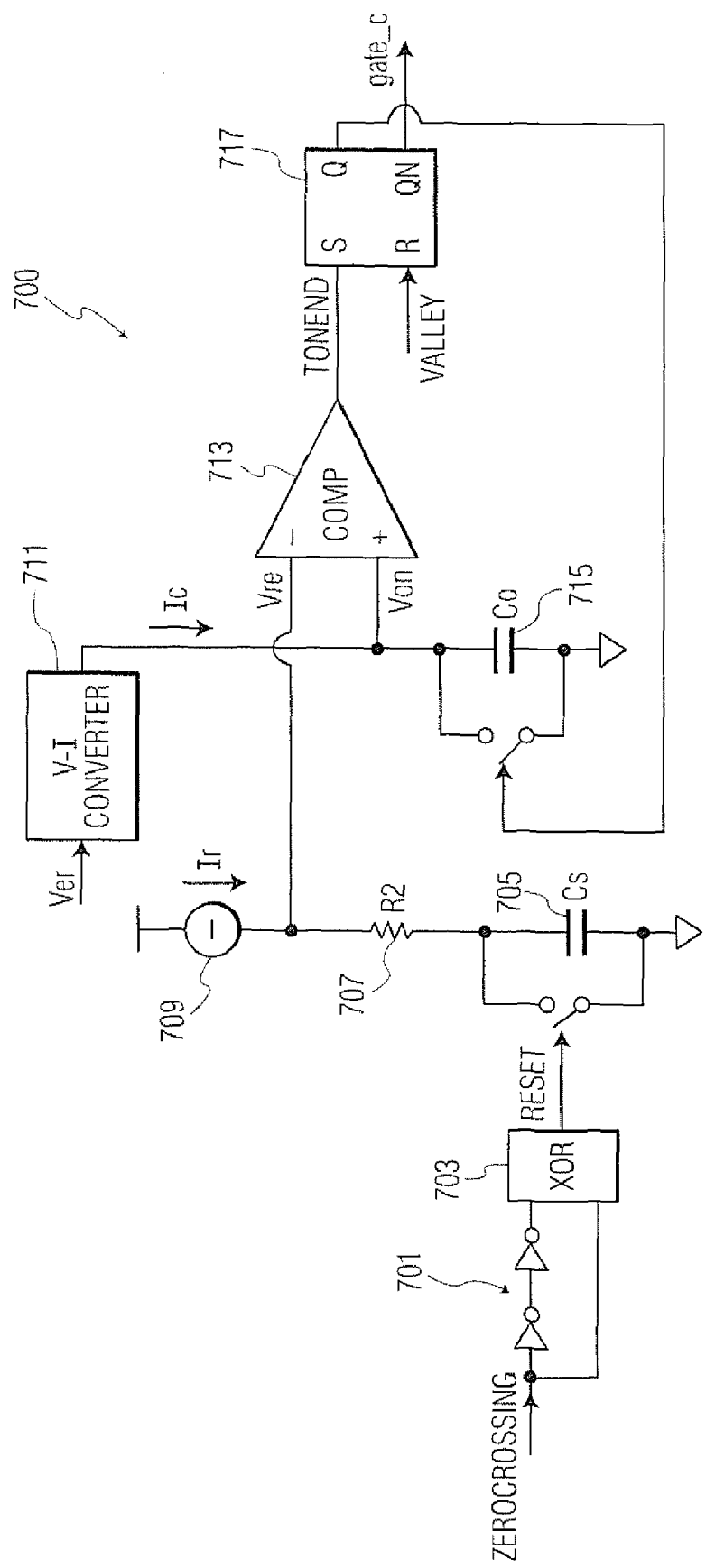
FIG. 7 is a schematic diagram of an exemplary timing control circuit.

Referring now to FIG. 7, a schematic diagram showing one illustrative example implementation 700 of timer control circuit 506 is illustrated. The example timer control circuit 700 may include a series of inverters 701, an XOR gate 703, a first capacitor 705, a resistor 707, a current source 709, a voltage to current (V/I) converter 711, a comparator 713, a second capacitor 715, and an SR latch 717. During regular operation, timer control circuit 700 may receive a zero-crossing voltage (the output of zero detection circuit 512), an error-amplified voltage (the output of error amplifier 504), and a valley-detection voltage (the output of valley detection circuit 510) and provide a signal for the gate of control switch 111.

In an exemplary embodiment, current source Ir 709 flows through resistor 707 and charges capacitor Cs 705 to generate a voltage Vre. Voltage Vre may linearly increase within each half mains cycle with a slope that may be used to define the slope of the switch-on time $T_{on}$. The slope of Vre may be linear. The zero-crossing signal received from zero-detection circuit 512 may be delayed with two inverters 701 before reaching XOR gate 703. XOR gate may receive the delayed signal and the zero-crossing signal without delay and may generate a reset signal, which may be used to control the charging and discharging of capacitor Cs 705. Resistor R2 707 is used to define the initial value of voltage Vre, and therefore, define the initial value of $T_{on}$. Error amplifier output signal Ver received from error amplifier 504 may generate a current Ic through V/I converter 711 that is proportional to Ver. Ic may be used to determine the average switch-on $T_{on}$ time for conversion cycles within each half mains cycle. Ic may charge second capacitor Co 715 to produce a voltage Von.

At the end of a switch-on time $T_{on}$, Von may be equal to Vre, and comparator 713, which receives Von and Vre, may output a signal (tonend) that may set SR latch 717 and result in a low output voltage (gate_c), which may turn off the control switch 111 via driver 508. SR latch may discharge capacitor Co with a parallel switch at the end of the switch-on time. When a minimum value of $V_{drain}$ during its oscillation time is detected at valley-detection circuit 510, valley-detection circuit 510 may produce a short impulse to signal valley, which may reset SR latch 717. Control switch 111 may then be turned on, and capacitor Co may start to be charged again by current Ic from V/I converter 711.

Figure 8:
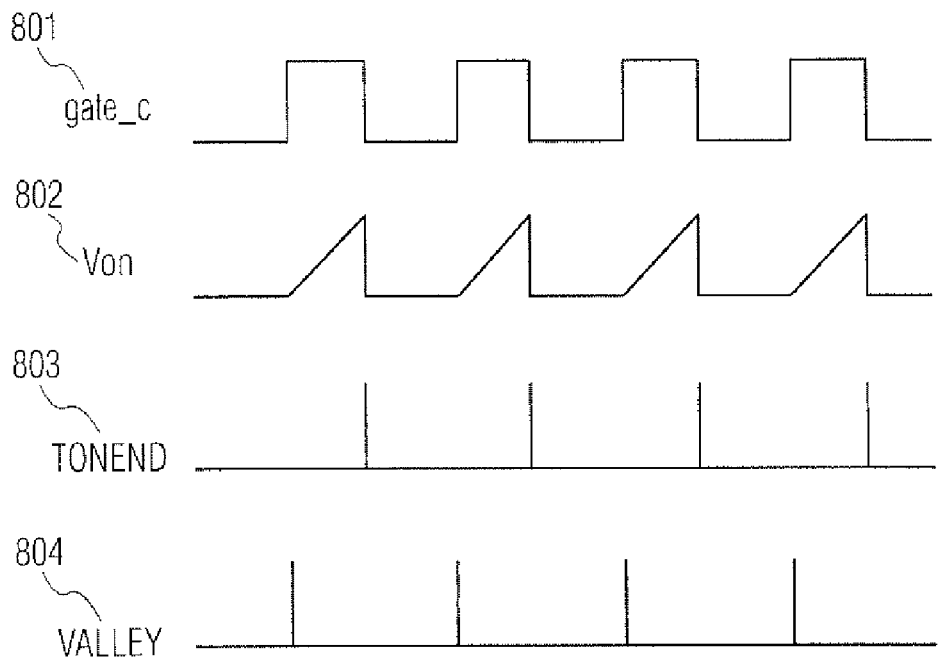
FIG. 8 is a timing diagram of the exemplary timing control circuit.

Referring now to FIG. 8, a timing diagram of the exemplary timer control circuit during multiple conversion cycles is illustrated. In FIG. 8, an impulse in valley-detection voltage 804 produced by valley-detection circuit 510 when the switch is off may trigger a reset of SR latch 717. The reset SR latch 717 may produce a positive gate_c signal 801 to drive control switch 111. The reset SR latch may also open a switch that may allow capacitor Co 715 to charge, which may produce a positive Von signal 802. Von will steadily increase as capacitor Co 715 is charged and gate_c may steadily send a constant positive signal in the form of a square wave until comparator 713 produces a tonend signal 803 that triggers SR latch 717, resulting in low outputs for the gate_c 801 and Von 802 signals.

Figure 9:
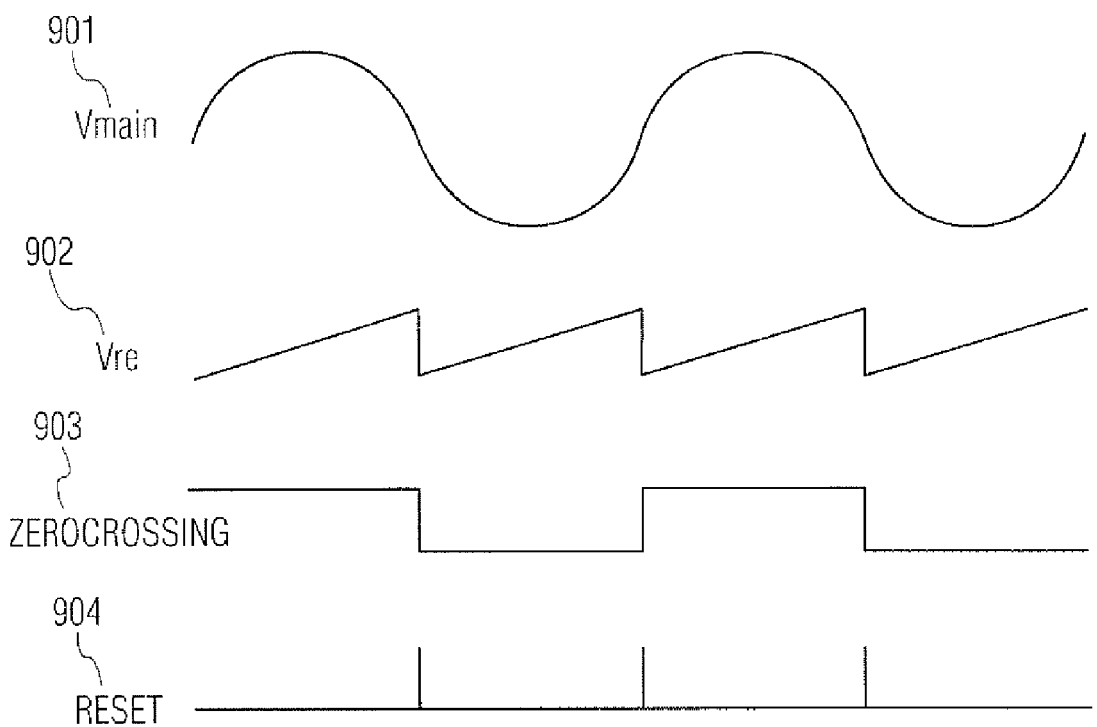
FIG. 9 is another timing diagram of the exemplary timing control circuit.

Referring now to FIG. 9, a timing diagram of the exemplary timer control circuit during multiple mains cycles is illustrated. Whenever zero-crossing signal 903 changes its logic value, which corresponds to a zero in mains signal 901, an impulse is produced in reset signal 904. This may result in discharging the first capacitor Cs 705, which may reset the Vre signal 902. Vre may steadily increase throughout a mains cycle as first capacitor Cs 705 is charged.

Figure 10:
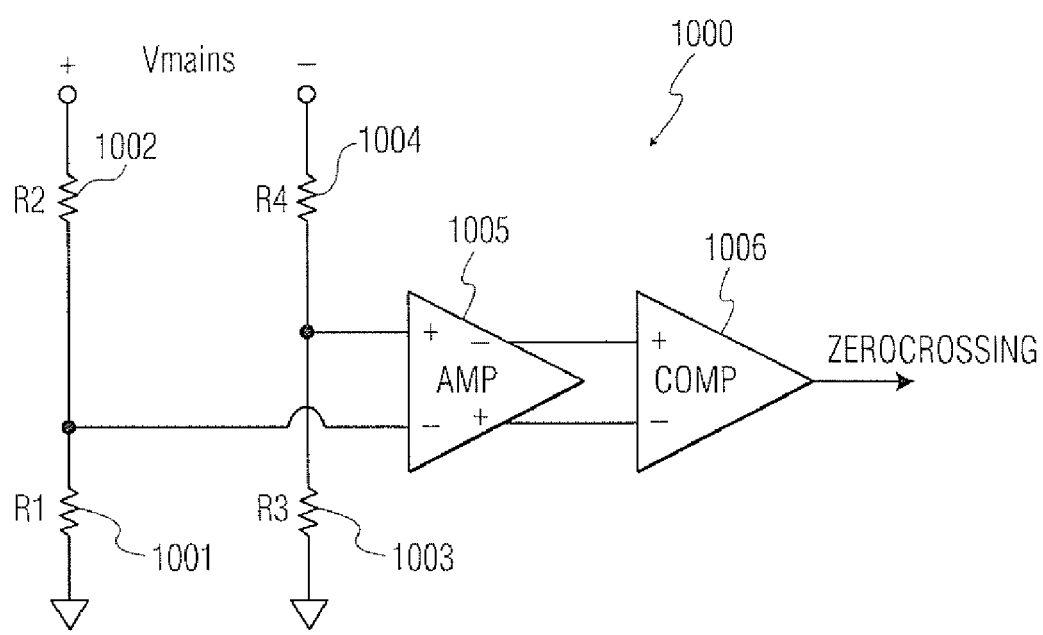
FIG. 10 is a schematic diagram of an exemplary zero-detection circuit.

Referring now to FIG. 10, an exemplary zero-detection circuit is illustrated. Zero-detection circuit 1000 may include four resistors 1001-1004, an amplifier 1005, and a comparator 1006. Amplifier 1005 may receive for a positive input the voltage from a first voltage divider (not separately numbered) consisting of, for example, resistor R2 1001 and R2 1002 and a negative input from a second voltage divider consisting of resistor R3 1003 and R4 1004. In some embodiments, R1=R3 and R2=R4. The first voltage divider may receive the positive terminal of mains AC voltage, while the second voltage divider may receive the negative terminal of mains AC voltage. Amplifier 1005 may then amplify its differential inputs. The output of amplifier 1005 may be connected to the input of comparator 1006, which may output a zero-crossing signal that changes logic value when the mains voltage is equal to zero.

Figure 11:
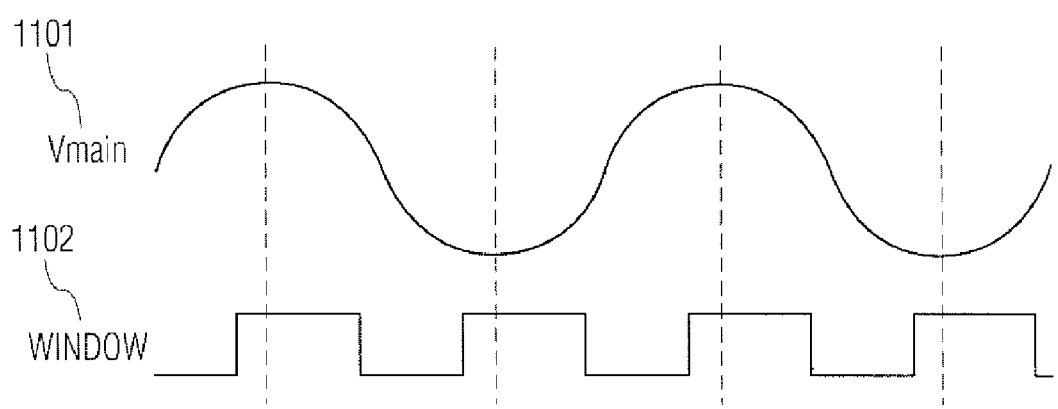
FIG. 11 is a timing diagram of another exemplary power factor corrector.

Referring now to FIG. 11, a timing diagram of another exemplary control circuitry 115 is illustrated. In the exemplary embodiment, during the mains cycle, the switch-on time $T_{on}$ for the conversion cycle of control switch 111 may remain constant. In addition, power from AC power source 101 may only be delivered in a timing window 1102 that occurs once during a mains half cycle period. In the illustrative embodiment, timing window 1102 occurs both during the rising time and the falling time of mains AC voltage 1101. However, the middle point of timing window 1102 may occur within the falling time of the absolute value of the mains AC voltage, so that a majority of the timing window 1102 occurs during the falling time of the absolute value of the mains AC voltage 1101. In this embodiment, the average coil current from inverter 109 during falling period $T_{fall}$ may also be larger than the average coil current during rising period $T_{rice}$, as the total switch-on time $T_{on}$ for the control switch 111 conversion cycles is larger during $T_{fall}$ than that during $T_{rise}$ due to the unbalanced timing window 1102 in favor of $T_{fall}$.

Figure 12:
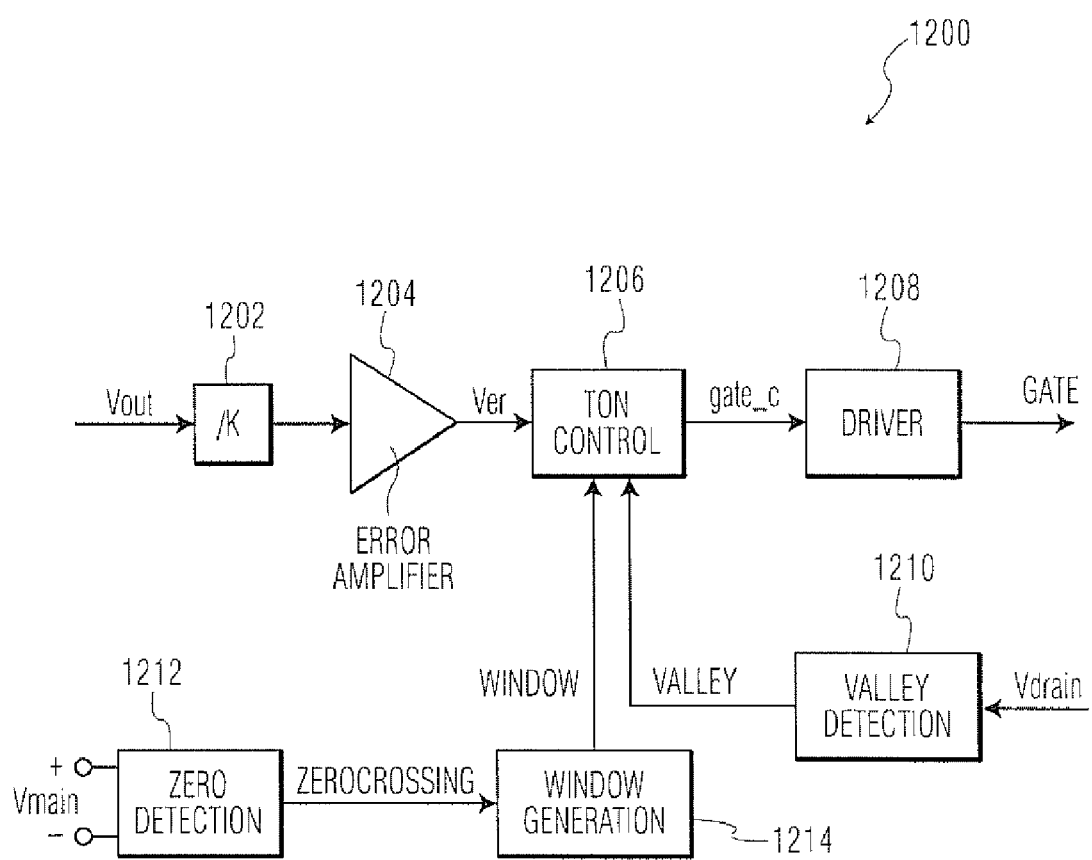
FIG. 12 is a block diagram other another control circuitry in a power factor corrector.

Referring now to FIG. 12, a block diagram of another exemplary control circuitry 1200 is illustrated. The example depicted at FIG. 12 is similar to the block diagram of the example control circuitry depicted at FIG. 5. Components 1202-1212 of control circuitry 1200 may be similar in overall function to components 502-512 of the FIG. 5 control circuitry 500; however the timer control circuit 1206 may not have switch-on time $T_{on}$ increase during a half mains cycle. Instead control circuitry 1200 may have timer control circuit 1206 maintain a constant switch-on time $T_{on}$ and may add a window generation circuit 1214. The output of zero-detection circuit 1212 may now output into window generation block 1214, which may use the zero-crossing signal to generate the timing window 1102. The generated timing window 1102 by window generation circuit 1214 may be used to define the timing interval of the power conversion for power factor corrector 100. Control switch 111 may therefore only turn on within the timing window 1102. Outside the timing window 1102, switch-on time $T_{on}$ may always zero and therefore control switch 111 may be always turned off.

Figure 13:
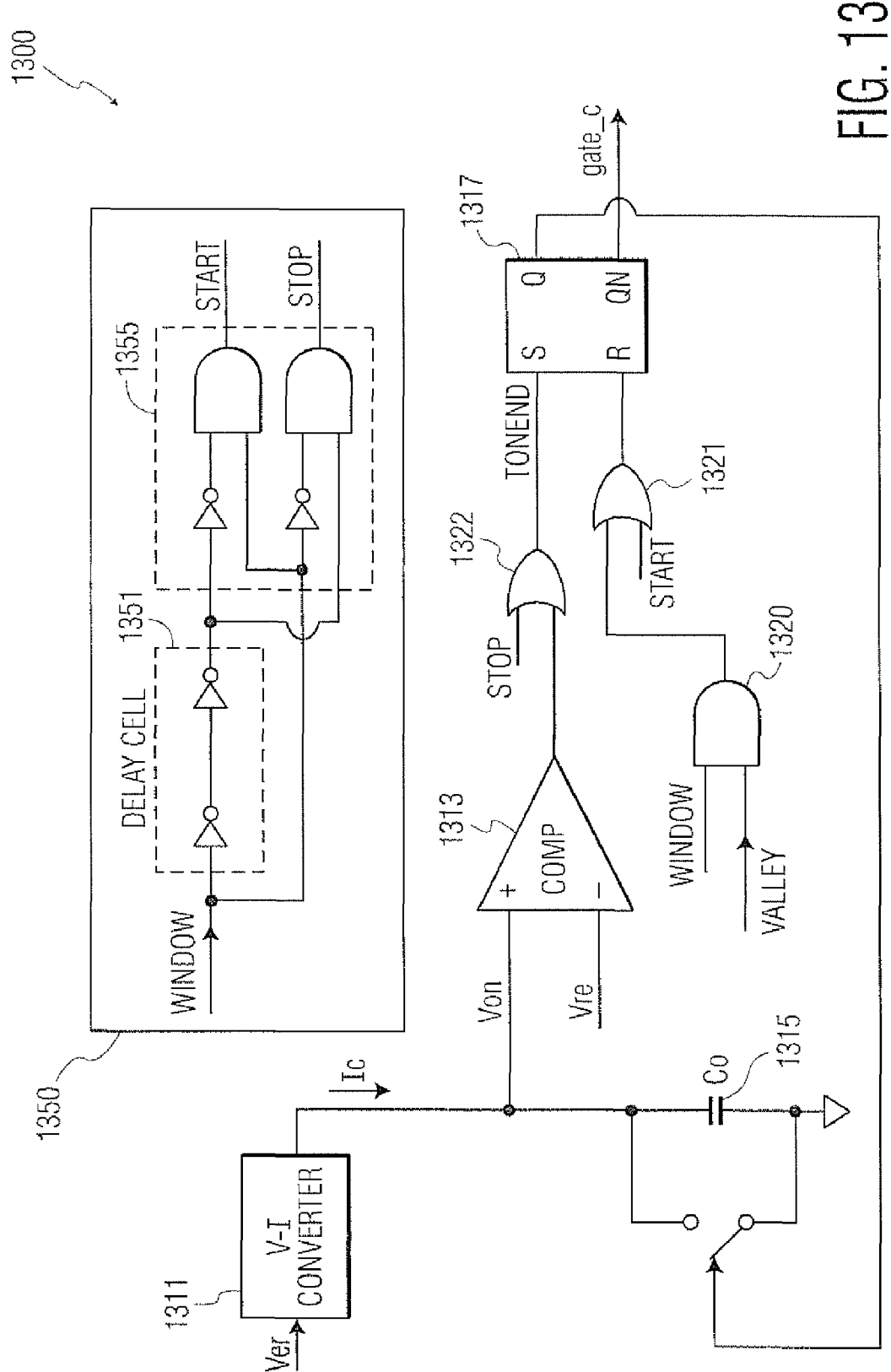
FIG. 13 is a schematic diagram of another exemplary timer control circuit.

Referring now to FIG. 13, a schematic diagram of an exemplary timer control circuit, labeled generally as 1300, is illustrated. Distinguished from the timer control circuit of FIG. 7, the timer control circuit 1300 does not contain components equivalent to 701-709 that determined signal Vre. Timer control circuit 1300 instead maintains a constant switch-on time $T_{on}$. Timer control circuit 1300 uses a reference voltage for Vre and adds a delay circuit 1350 that receives the windowing signal from windowing circuit 1214 and outputs start and stop signals to into SR latch 1317, which makes gate_c signal high at the beginning of a timing window and low at the end of a timing window. The delay circuit 1350 may consist of a delay cell 1351 of comprising a series of inverters that, with the windowing signal from windowing circuit 1214, produces a signal that inputs into combination circuit 1355 to generate short impulses. The delay circuit 1350 may produce a start impulse to start the power conversion and a short impulse (stop) to stop the power conversion within in each half mains cycle. The output of the start signal may be combined at OR gate 1321 with the AND gate 1320 output of the windowing signal from windowing circuit 1214 and valley signal from valley-detection circuit 1210. The output of the stop signal may be combined at OR gate 1322 with the output of comparator 1313 to produce the tonend signal. Within each timing window 1102, switch-on time $T_{on}$ may be defined by the charging time of capacitor Co 1315. Switch-on time of control switch 111 may therefore be determined by the current Ic that charges capacitor Co 1315 to a reference level Vre and is made proportional to the error amplifier 1204 output Ver by V/I converter 1311.

Figure 14:
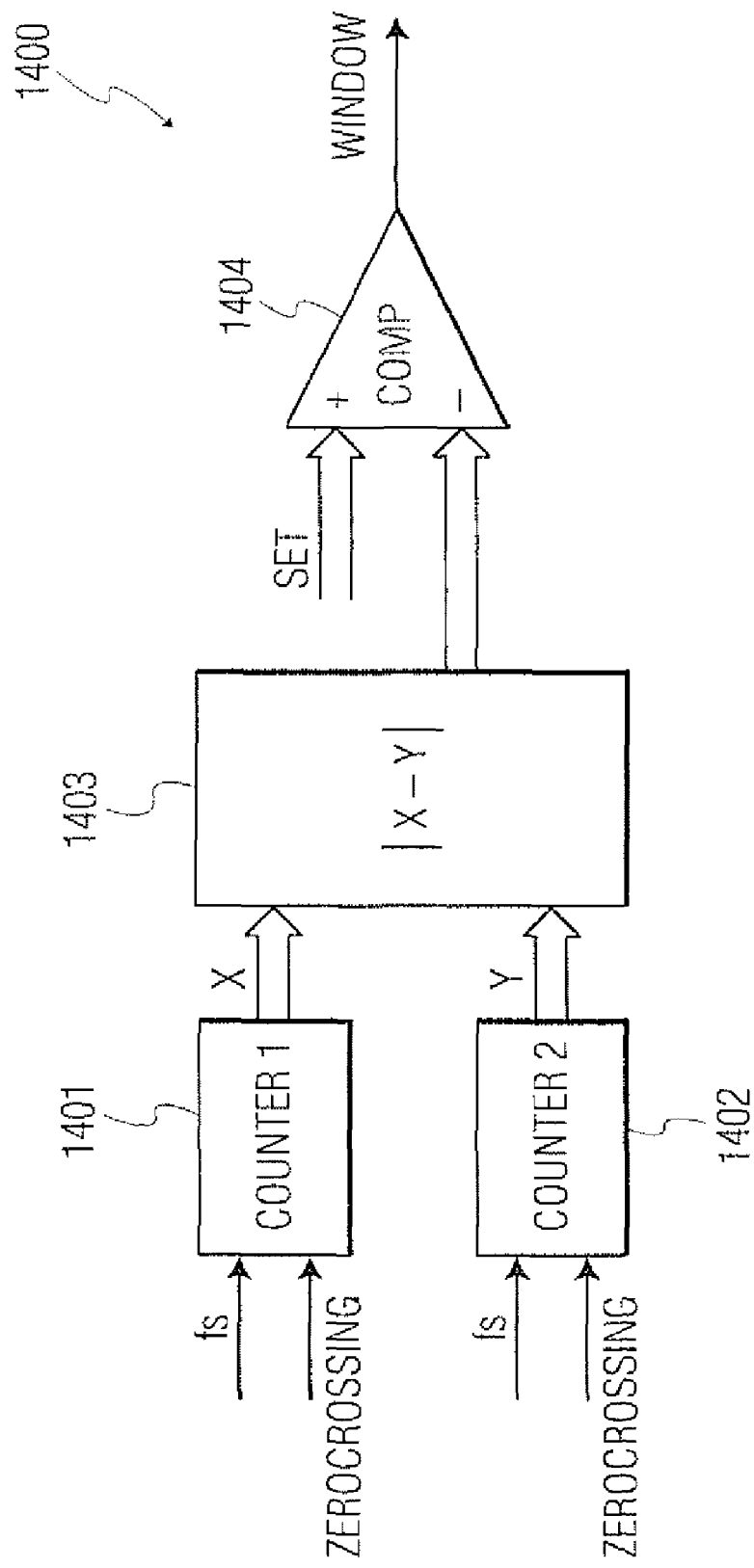
FIG. 14 is a schematic diagram of an exemplary window generation circuit.

Referring now to FIG. 14, a schematic diagram of a window generation circuit, labeled generally as 1400, is illustrated. Windowing circuit 1400 may include first and second counters 1401, 1402, combination circuit 1403, and comparator 1404. Both counters 1401, 1402, may be up-and-down counters. Both counters 1401, 1402 may work with a synchronous clock (not shown). During a mains cycle, one of the two counters, for example first counter 1401, may count up, while the other counter, for example second counter 1402, may simultaneously count down. In some embodiments, the counter that counts up in the last half mains cycle may first keep data constant from the zero-crossing point for some synchronous clock cycles, then proceed to count down until the next zero-crossing point. In addition, the counter that counts down in the last half mains cycle may first reset the output data to zero at the zero-crossing point, then start counting up until the next zero-crossing point. Combination circuit 1403 may then calculate and output the absolute value of the difference between the two counters output data. The output of combination circuit 1403 may then be compared with a defined digital data, such as for example, a set signal, with comparator 1404 that may output a desired timing window signal.

Figure 15:
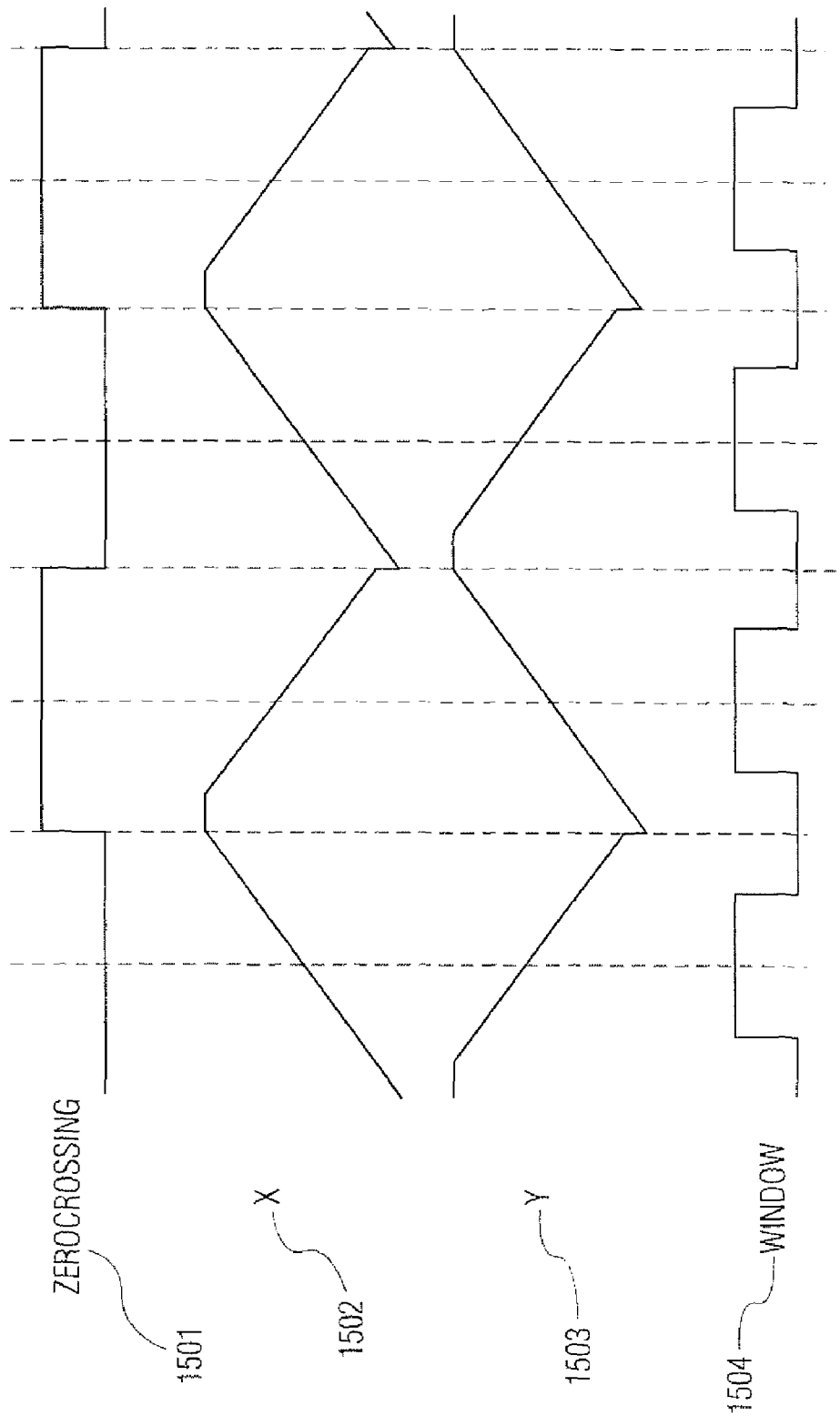
FIG. 15 is a timing diagram of the exemplary window generation circuit.

Referring now to FIG. 15, a timing diagram of an exemplary window generation circuit, generally labeled as 1500, is illustrated. As seen when zero-crossing signal of the mains cycle period 1501 changes from zero to one (while the timing window 1504 remains constant), the output 1502 of the first counter 1401 that was counting up first keeps the data constant for a time and then counts down. Conversely, the output 1503 of second counter 1402 that was counting down immediately resets to zero and begins to count up.

Figure 16:
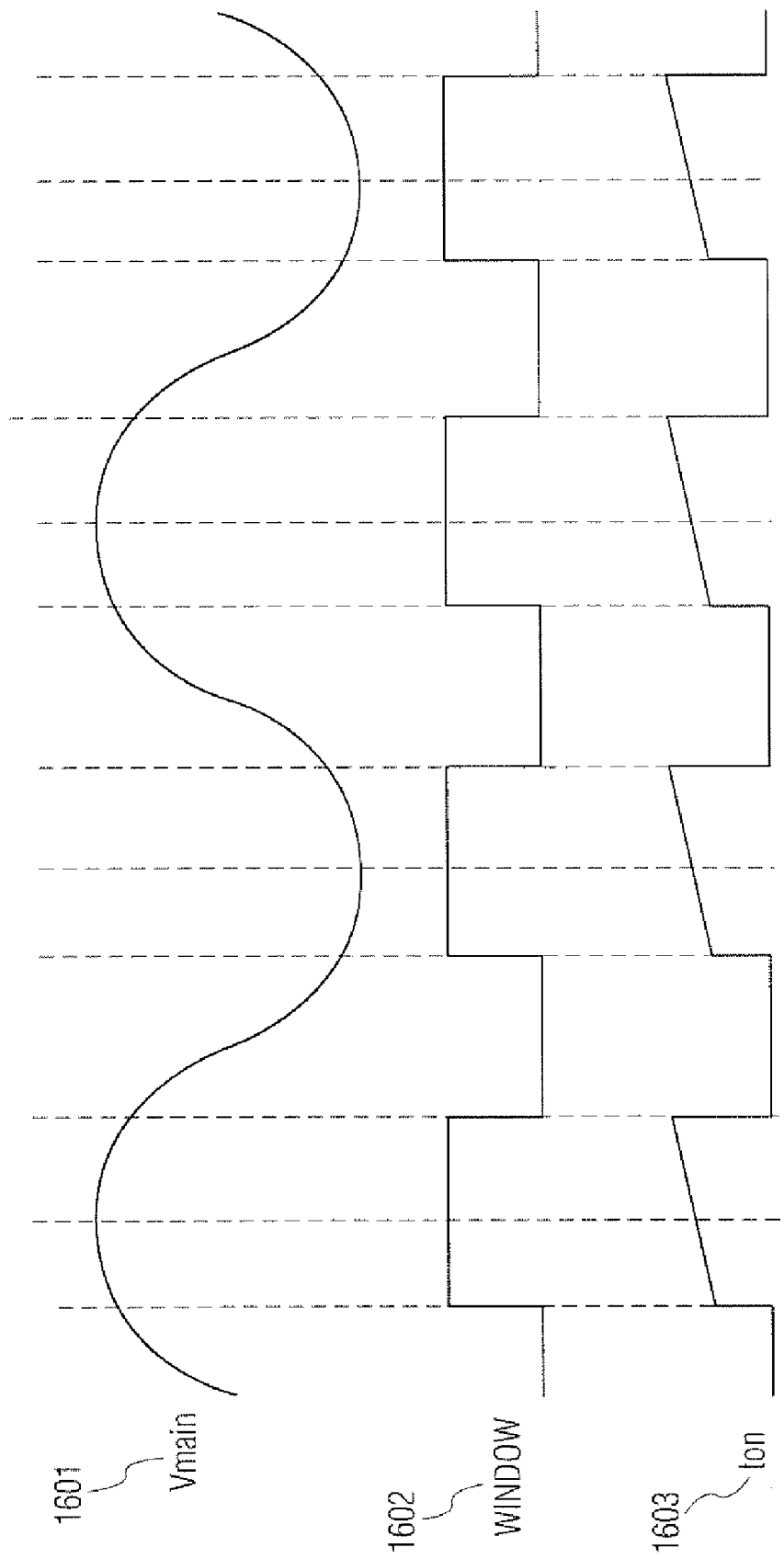
FIG. 16 is a timing diagram of another exemplary power factor corrector.

Referring now to FIG. 16, a timing diagram for another exemplary power factor corrector is illustrated. In the exemplary embodiment, power may be delivered only in a periodic timing window 1602 whose middle point occurs during a moment in the falling time of the absolute value of the mains AC voltage 1601. In the exemplary embodiment, switch-on-time $T_{on}$ 1603 of the conversion cycle of control switch 111 will also increase from the within the timing window 1602.

Figure 17:
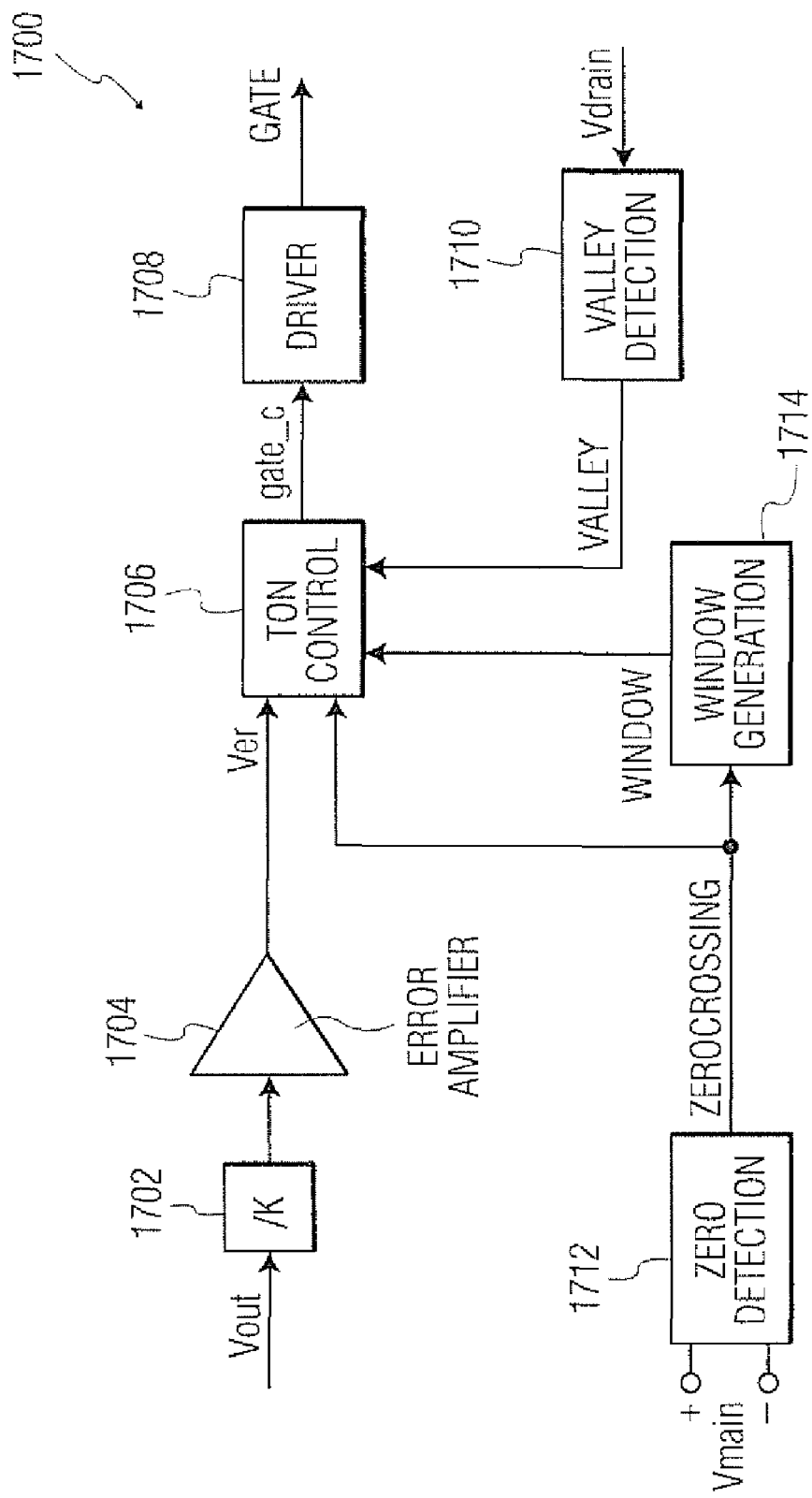
FIG. 17 is a block diagram of another exemplary control circuitry in a power factor corrector.

Referring now to FIG. 17, a block diagram of another exemplary power factor corrector, generally labeled as 1700, is illustrated. Similar to the power factor corrector 1200, with components 1702-1714 corresponding to components 1202-1214, the zero-crossing signal generated from zero-detection circuit 1712 is outputted to both timer control circuit 1706 and window generation circuit 1714.

Figure 18:
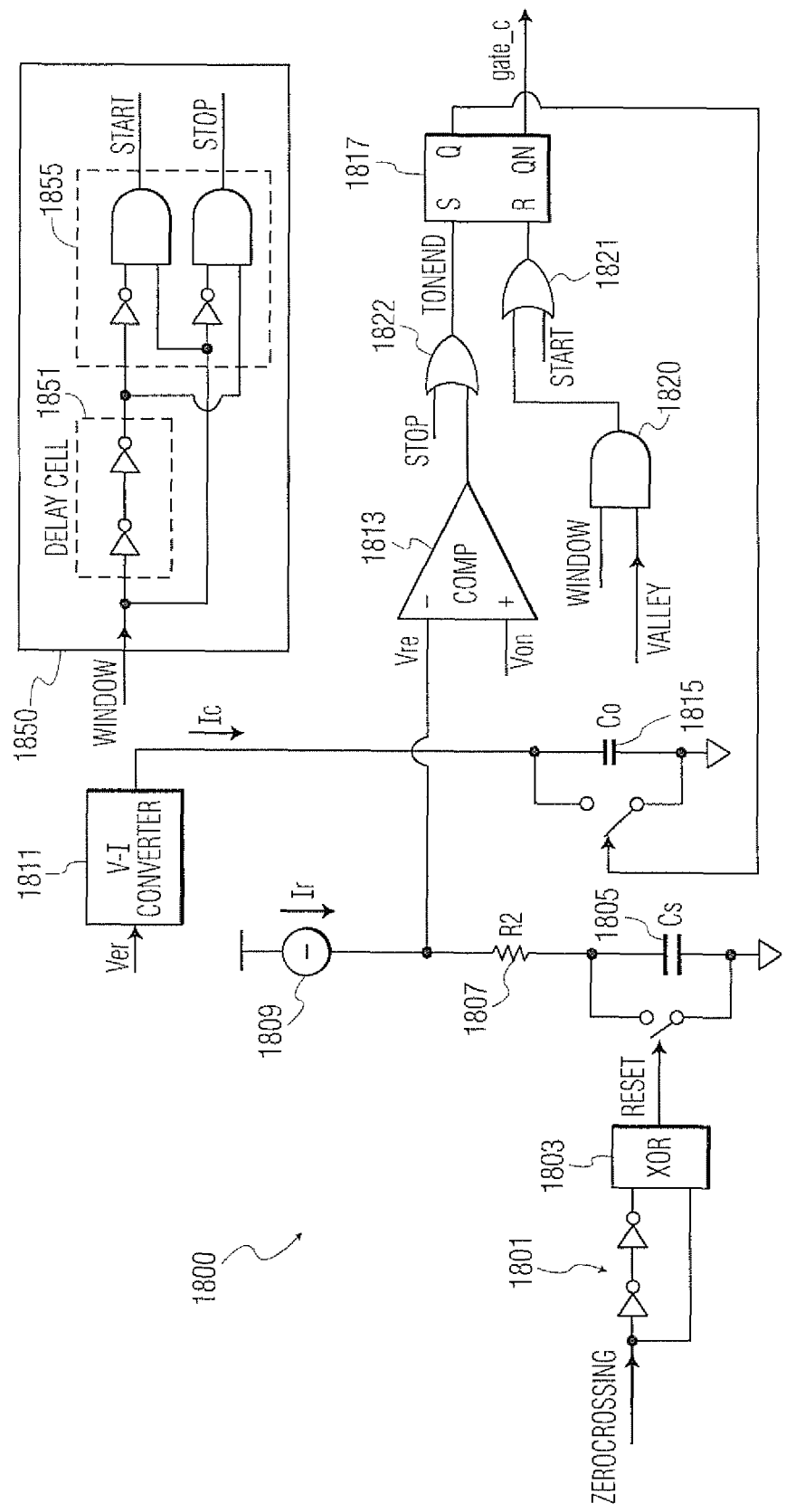
FIG. 18 is a schematic diagram of another exemplary timer control circuit.

Referring now to FIG. 18, a schematic diagram of another exemplary timer control circuit, generally labeled as 1800, is illustrated as an example of implementation of 1706. Similar to the timer control circuits of FIGS. 7 and 13, components 1801-1822 and 1850-1855 in timer control circuit 1800 correspond to like-named components in timer control circuits 700 and 1200, respectively. In this embodiment, Vre is not a reference voltage; rather Vre is generated from components 1801-1809 in a similar manner to voltage Vre generated from components 701-709 in FIG. 7.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method of controlling power delivered to a load by an AC/DC power converter having a switched-mode power supply (SMPS) that includes a control switch, switchable between an ON and an OFF state and only conducting during said ON state, for controlling a drive current delivered to the load, the AC/DC power converter receiving a mains alternating-current (AC) voltage as an input, the mains AC voltage having a mains voltage cycle of an absolute voltage value varying in a cyclic manner over a cycle period having a first half-cycle period of increasing from a zero to a maximum followed by a second half-cycle period of decreasing from the maximum to a zero, the method comprising:
   receiving the mains AC voltage;
   rectifying the mains AC voltage to produce a direct-current (DC) voltage;
   producing an output voltage from the DC voltage;
   delivering the output voltage and the drive current to the load, the output voltage and drive current controlled by the control switch in the SMPS;
   shifting a timing of the drive current relative to the mains voltage cycle by generating a sequence of current control pulses within each cycle period, each current control pulse causing the control switch to have said ON state, and each current control pulse having a respective duration $T_{on}$, wherein said generating has a timing relative to the first and the second half-cycle periods, wherein said timing provides a sum of the $T_{on}$ of all current control pulses within the second half-cycle period that is substantially larger than a sum of the $T_{on}$ of all current control pulses within the first half-cycle period.

2. The method of claim 1, wherein the $T_{on}$ of an nth current control pulse in the sequence of current control pulses within a cycle period is of a longer duration than the $T_{on}$ of a (n−1)th current control pulse in the sequence of current control pulses, wherein the nth current control pulse is generated after the (n−1)th current control pulse.

3. The method of claim 2, wherein the difference between the $T_{on}$ of the nth current control pulse and the $T_{on}$ of the (n−1)th current control pulse is constant over a span of at least three (3) consecutive current control pulses.

4. The method of claim 1, wherein said shifting comprises:
   generating a timing window in each cycle period having a start time and a duration relative to the first and the second half-cycle periods, and
   generating said sequence of current control pulses only within said timing window; wherein said timing window start time and said timing window duration are such that the sum of all of the $T_{on}$ values generated during the second half-cycle period is substantially larger than the sum of all of the $T_{on}$ values generated during the first half-cycle period.

5. The method of claim 4, wherein the difference between the $T_{on}$ of the nth current control pulse and the $T_{on}$ of the (n−1)th current control pulse is zero over a span of at least three (3) consecutive current control pulses and a majority of the timing window occurs during the second half-cycle period.

6. The method of claim 4, wherein the $T_{on}$ of an nth current control pulse in the sequence of current control pulses within the timing window is of a longer duration than the $T_{on}$ of a (n−1)th current control pulse in the sequence of current control pulses, wherein the nth current control pulse is generated after the (n−1)th current control pulse.

7. The method of claim 6, wherein the difference between the $T_{on}$ of the nth current control pulse and the $T_{on}$ of the (n−1)th current control pulse is constant over a span of at least three (3) consecutive current control pulses.

8. The method of claim 4, wherein the generating a timing window step further comprises:
   producing a first count signal that counts up in a last cycle period, the first count signal switching to count down at or after the end of the last cycle period;
   producing a second count signal that counts down in the last cycle period, the second counter switching to count up at or after the end of the last cycle period;
   producing a difference signal equal to the absolute value of the difference between the first and second count signals;
   producing a windowing signal from the difference signal and a set signal.

9. The method of claim 1, wherein:
   said shifting comprises:
     generating a timing window in each cycle period having a start time and a duration relative to the first and the second half-cycle periods, and
     generating said sequence of current control pulses only within said timing window; wherein said timing window start time and said timing window duration are such that the sum of all of the $T_{on}$ values generated during the second half-cycle period is substantially larger than the sum of all of the $T_{on}$ values generated during the first half-cycle period; and
   said generating a sequence of current control pulses within each cycle period controls $T_{on}$ by:
     detecting a zero of said input mains voltage and, in response, generating a pulse timing reference voltage having a value increasing with respect to time over a pulse timing reference voltage duration not greater than one cycle period;

detecting a minimum voltage on a power capacitor connected in parallel with the current control switch during the oscillation period of the power capacitor and, in response, generating a valley detect signal;

in response to said valley detect signal, sending a charging current to a pulse timing capacitor; and comparing a voltage on the pulse timing capacitor to the pulse timing reference voltage and setting $T_{on}$ equal to the time lapse between the start of said sending the charging current and a comparison result indicating a comparison criterion being met.

10. The method of claim 9, wherein the $T_{on}$ of an nth current control pulse in the sequence of current control pulses within said timing window is of a longer duration than the $T_{on}$ of a (n−1)th current control pulse in the sequence of current control pulses, wherein the nth current control pulse is generated after the (n−1)th current control pulse.

11. The method of claim 1, wherein said generating a sequence of current control pulses within each cycle period controls $T_{on}$ by:

detecting a zero of said input mains voltage and, in response, generating a pulse timing reference voltage having a value increasing with respect to time over a pulse timing reference voltage duration not greater than one cycle period;

detecting a minimum voltage on a power capacitor connected in parallel with the current control switch during the oscillation period of the power capacitor and, in response, generating a valley detect signal;

in response to said valley detect signal, sending a charging current to a pulse timing capacitor;

comparing a voltage on the pulse timing capacitor to the pulse timing reference voltage and setting $T_{on}$ equal to the time lapse between the start of said sending the charging current and a comparison result indicating a comparison criterion being met.

12. The method of claim 11 further comprising controlling said output voltage based on a given reference voltage, wherein said controlling said output voltage comprises:

comparing a voltage proportional to said output voltage to said given reference voltage and generating, in response, a voltage error signal; and based on said voltage error signal, adjusting said charging current to said pulse timing capacitor.

13. The method of claim 11, wherein the detecting a zero step further comprises:

receiving a mains AC voltage signal;

producing a differential signal whose amplitude is proportional to the amplitude of the AC mains voltage signal; and producing a zero-crossing signal in response to the differential signal.

14. The method of claim 13, wherein:

said shifting comprises:

generating a timing window in each cycle period having a start time and a duration relative to the first and the second half-cycle periods, and generating said sequence of current control pulses only within said timing window; wherein said timing window start time and said timing window duration are such that the sum of all of the $T_{on}$ values generated during the second half-cycle period is substantially larger than the sum of all of the $T_{on}$ values generated during the first half-cycle period; and said generating a sequence of current control pulses within each cycle period controls $T_{on}$ by:

detecting a zero of said input mains voltage and, in response, generating a pulse timing reference voltage having a value increasing with respect to time over a pulse timing reference voltage duration not greater than one cycle period;

detecting a minimum voltage on a power capacitor connected in parallel with the current control switch during the oscillation period of the power capacitor and, in response, generating a valley detect signal;

in response to said valley detect signal, sending a charging current to a pulse timing capacitor; and comparing a voltage on the pulse timing capacitor to the pulse timing reference voltage and setting $T_{on}$ equal to the time lapse between the start of said sending the charging current and a comparison result indicating a comparison criterion being met.

15. A circuit to control power delivered to a load by an AC/DC power converter, the AC/DC power converter receiving a mains alternating current (AC) voltage as an input, the mains AC voltage having a mains voltage cycle of an absolute voltage value varying in a cyclic manner from a zero to a zero over a cycle period, the cycle period having a first half-cycle period during which the absolute voltage value increases from the zero to a maximum, and a second half-cycle period during which the absolute voltage value decreases from the maximum to the zero, the circuit comprising:

a rectifier to receive the mains AC voltage and produce a direct-current (DC) voltage;

a switched mode power supply (SMPS) to receive the DC voltage, produce an output voltage, and provide the output voltage and a drive current to the load, the SMPS including a control switch, being switchable between an ON and an OFF state and only conducting during said ON state, to control the output voltage and drive current delivered to the load; and a timer control circuit to drive the control switch between the ON and OFF states, wherein the control circuitry shifts a timing of the drive current relative to the mains voltage cycle by generating a sequence of current control pulses within each cycle period, each current control pulse causing the control switch to have the ON state, and each current control pulse having a respective duration $T_{on}$ wherein the generating has a timing relative to the first and second half-cycle periods, wherein the timing provides a sum of the $T_{on}$ of all current control pulses within the second half-cycle period that is substantially larger than a sum of $T_{on}$ of all current control pulses within the first half-cycle period.

16. The circuit of claim 15, wherein the $T_{on}$ of an nth current control pulse in the sequence of current control pulses within a cycle period is of a longer duration that the $T_{on}$ of a (n−1)th current control pulse in the sequence of current control pulses, wherein the nth current control pulse is generated after the (n−1)th current control pulse.

17. The circuit of claim 16, wherein the difference between the $T_{on}$ of the nth current control pulse and the $T_{on}$ of the (n−1)th current control pulse is constant over a span of at least three (3) consecutive control pulses.

18. The circuit of claim 15, wherein the timer control circuit generates a timing window having a start time and a duration relative to the first and the second half-cycle periods, wherein:

the timer control circuit generates the sequence of current control pulses only within the timing window, and the timing window start time and the timing window duration are such that the sum of all the $T_{on}$ values generated during the second half-cycle period is substantially larger than the sum of all the $T_{on}$ values generated during the first half-cycle period.

19. The circuit of claim 18, wherein the $T_{on}$ of an nth current control pulse in the sequence of current control pulses within the timing window is of a longer duration than the $T_{on}$ of a (n−1)th current control pulse in the sequence of current control pulses, wherein the nth current control pulse is generated after the (n−1)th current control pulse.

20. The circuit of claim 19, wherein the difference between the $T_{on}$ of the nth current control pulse and the $T_{on}$ of the (n−1)th current control pulse is constant over a span of at least three (3) consecutive control pulses.

21. The circuit of claim 15, further comprising:
a zero-detection circuit to detect a zero of the input mains voltage and generate a pulse timing reference voltage in response, the pulse timing reference voltage having a value increasing with respect to time over a pulse timing reference voltage duration not greater than one cycle period; and
a valley-detection circuit to detect a minimum voltage on a power capacitor connected in parallel with the current control switch during the oscillation period of the power capacitor and generate a valley detect signal in response;
wherein the timer control circuit sends a charging current to a pulse timing capacitor in response to the valley detect signal and compares a voltage on the pulse timing capacitor to the pulse timing voltage and sets $T_{on}$ equal to the time lapse between the start of the sending of the charging current and a comparison result indicating a comparison criterion is being met.

22. The circuit of claim 21, the timer control circuit further comprising:
a comparator to compare the voltage on the pulse timing capacitor to the pulse timing reference voltage and produce a triggering signal; and
a trigger circuit that receives the triggering signal and the valley detect signal and sets $T_{on}$ equal to the time lapse between the start of the sending of the charging current and a comparison result indicating a comparison criterion is being met.

23. The circuit of claim 22, wherein the timer control circuit controls the output voltage based on a given reference voltage by:
comparing a voltage proportional to the output voltage with the given reference voltage,
generating a voltage error signal in response, and
adjusting the charging current to the pulse timing capacitor based on the voltage error signal.

24. The circuit of claim 22, wherein the timer control circuit generates a timing window having a start time and a duration relative to the first and the second half-cycle periods, wherein:
the timer control circuit generates the sequence of current control pulses only within the timing window, and
the timing window start time and the timing window duration are such that the sum of all the $T_{on}$ values generated during the second half-cycle period is substantially larger than the sum of all the $T_{on}$ values generated during the first half-cycle period.

25. The circuit of claim 24, further comprising:
a windowing circuit comprising:
a first counter that counts up a last half-cycle period, the first counter switching to count down on or after the end of the last cycle period;
a second counter that counts down the last half-cycle period, the second counter switching to count up on or after the end of the last cycle period;
a combination circuit that receives the output of the first and second counters and produces an absolute value of the difference between the output of first and second counters; and
a comparator that receives the output of the combination circuit and a set signal and produces a windowing signal; and
a delay circuit that receives the windowing signal an produces a start and stop signal.

26. The circuit of claim 25, wherein the trigger circuit further receives the start signal, the stop signal, and the valley detect signal and sets $T_{on}$ equal to the time lapse between the start of the sending of the charging current and a comparison result indicating a comparison criterion is being met.

27. The circuit of claim 21, the zero-detection circuit further comprising:
an amplifier to receive a differential voltage proportional to the mains AC voltage and produce a differential amplified mains signals, the differential voltage comprising a first single-ended voltage proportional to the voltage on the positive terminal of the main source and a second single-ended voltage proportional to the voltage on the negative terminal of the main source; and
a comparator to receive the differential amplified mains signals and produce a zero-crossing signal when the differential amplified mains signals are equal to zero.

* * * * *